April 30, 1963 W. S. POOR ETAL 3,087,373
OSCILLATORY SCANNING SYSTEM
Filed Aug. 26, 1960 2 Sheets-Sheet 1

INVENTOR.
WALTER S. POOR
MORRIS H. ARCK
BY
Robert Ames Norton
ATTORNEY

April 30, 1963     W. S. POOR ETAL     3,087,373
OSCILLATORY SCANNING SYSTEM

Filed Aug. 26, 1960     2 Sheets-Sheet 2

*INVENTOR.*
WALTER S. POOR
MORRIS H. ARCK
BY
*ATTORNEY*

United States Patent Office 3,087,373
Patented Apr. 30, 1963

3,087,373
OSCILLATORY SCANNING SYSTEM
Walter S. Poor, New Canaan, and Morris H. Arck, South Norwalk, Conn., assignors to Barnes Engineering Company, Stamford, Conn., a corporation of Delaware
Filed Aug. 26, 1960, Ser. No. 52,165
7 Claims. (Cl. 88—1)

This invention relates to an improved oscillating scanning device and, in a more specific aspect, to systems combining said devices with electronic circuits for stabilizing and determning altitude of objects receiving signals from horizon, such as high flying airplanes and satellites which are capable of continuously viewing the earth's horizon.

A number of instruments have been developed which are capable of sensing the horizon. Among the most effective of which are horizon sensors such as those described and claimed in the application of Monty M. Merlen, Serial No. 852,548, filed November 12, 1959, now Patent No. 3,020,407. Such horizon sensors, although practically useful in satellites and other vehicles, have certain limitations. The scanning means are conical and, as a result, there is a limitation on the altitude of the vhicle in which the horizon sensor is used with reasonable accuracies. While this limitation runs into a thousand or some miles, it is still a limitation and one of the advantages of the present invention is that there is practically no limit to the altitude in which observations can be made very accurately so long as the horizon surrounds a finite disc. Also, it is an advantage of the present invention that it is possible to obtain continuous altitude readings as well as horizon sensing with the production of suitable error signals.

The present invention utilizes oscillating scanning optics. These effect scans across the horizon and there is no limitation on the altitude on which it can be used so long as the reference object, such as the earth, appears as a disc subtending an angle substantially greater than the oscillatory scan angle.

Oscillatory scanning may be effected by oscillating a mirror, a detector, preferably with an associated preamplifier, or any other components of an optical system which will produce scanning. The scanning component or components are mounted on an element which in turn is pivoted on a particular type of torsion bar passing through the center of scan oscillation at right angles thereto. The ends of the torsion bar are mounted in suitable supports. The torsion bar is of special design.

The peculiar characteristics of the torsion bar used in the oscillatory scanning mechanisms of the present invention can be better understood by consideration of the requirements. It is necessary that the torsion bar twist fairly easily about its own axis, as this produces the scan. It is, however, vital that the torsion bar resist twisting about either of the two axes perpendicular to the axis of the bar. If weight and power were no considerations, the solution of the problem is simple. All that is necessary is to utilize an oversized ordinary torsion bar. However, for all practical purposes, weight and power consumption are extremely vital and must be kept to the irreducible minimum. According to the present invention, this is effected by dividing the torsion bar into two sections, one on either side of the oscillatory scanning mechanism. These sections are in the form of thin plates, the two plates being at right angles to each other. This results in a torsion bar of light weight requiring but little power for oscillating the scanning mechanism, and at the same time, each plate in its long dimension at right angles to the bar axis is extraordinarily stiff. Since the two sections are plates at right angles to each other each one resists strongly any bending or twisting of the oscillatory mechanism about an axis at right angles to the plane of the plate. These two axes, being at right angles to each other and also at right angles to the axis of the bar as a whole, result in a device having extreme rigidity against bending or twisting about any axis other than that of the bar itself. Reference has been made to the bar being in two sections, this does not mean that they have to be physically separate pieces of metal or other material. A bar having a round center section and flat plate outer sections at right angles to each other is just as effective as two physically separated plates.

Scanning oscillation is maintained by mounting armature elements on the scanning mechanism which are situated in the field of a driving coil and sensing coil of an oscillatory circuit. Oscillation frequency is determined by the resonant period of the torsion bar and scanning mechanism, and it is not necessary that the oscillatory circuit applying timed magnetic pulses to the armature elements be sharply tuned to the same frequency. It is sufficient that it is capable of oscillating at a frequency near the resonant frequency of the bar and other associated elements. The effect is similar to a crystal controlled oscillator circuit, though the mechanism by which this result is brought about uses entirely different physical forces.

Reference has been made above to oscillating an element of an optical system in order to effect scanning. In general, the optical system of an instrument may be considered in somewhat simplified form as collecting optics, which may be a window, beam path directing means and a detector for the optical radiation in question. Sometimes, one element may perform more than one of these functions, for example, if the path through an instrument is straight, the collecting optics may be considered also to perform the function of directing the beam through the instrument. Similarly, the detector may be provided with collecting or imaging optics such as a detector immersed in a lens. To effect scanning, any one of these elements may be oscillated. In practical instruments, because of light weight and ease, usually a small mirror or other reflecting element in the beam directing portion of the instrument or else the detector itself is oscillated. In the latter case, for instruments of high sensitivity which will frequently be encountered in infrared instruments, oscillating the detector alone may be unsuitable because of excessive noise production. In such cases, a detector and an extremely light preamplifier may be oscillated, the detector output signal is thus brought up to a sufficient level so that noise is overridden. Oscillating other components, such as the whole of the collecting optics will, of course, also produce the same scan but the weights involved and complications make such modifications rarely of any practical significance.

Turning now to the systems aspect of the present invention, three instruments are positioned about a circle preferably, though not essentially, two at ends of a diameter, and a third on the arc of the circle at 90°. The circle in question constitutes a plane which is parallel to the plane of the horizon when the vehicle, in which the system is incorporated, is in level flight, that is to say, at a predetermined attitude with respect to the plane of the horizon. In most cases this attitude will be parallel. Each instrument scans by oscillating radially through a small arc. If the scan is centered on the horizon, the electronic circuits actuated by the detector will produce no signal. If it is not so centered, a signal is produced resulting in a correction of aiming of the instrument until the oscillatory scan is once more centered on the horizon. The degree by which the aiming is changed is a measure of departure from parallelism and this measure is preferably in the form of an electrical output signal. Circuits comparing the output signals from the detector at 90° with either of those at the end of the diameter, gives information with respect to rotations about the pitch or roll axis of the vehicle respectively. When the vehicle is centered on these two axes, that is to say on level flight, the sum of the electrical signals from the two detectors and circuits at opposite ends of the circle diameter gives an output quantity which is an inverse function of altitude.

It should be understood that the instruments of the present invention when arranged in the system, produce error signals when the vehicle is not in level flight with respect to the pitch axis or roll axis or both. These error signals are used in conventional manner through suitable servo-mechanisms to restore the vehicle to level flight. These restoring mechanisms form no part of the present invention, as any conventional designs may be used. It might be considered, therefore, that the present invention ends with the production of error signals. This will be apparent when it is thought that the same general types of error signals are produced with conical scan horizon sensors, and, of course, the righting mechanisms are completely uninterested in the past history of the signals they receive, and will respond just the same to the same type of signal regardless of whether it is produced by conical scan sensors or by the improved oscillating scan sensors of the present invention.

A big advantage of the present invention is that there is no rotating scanner but only oscillation about the axis of the torsion bar. Any continuously rotating device presents problems in wear, lubrication and the like, and when long unattended operations are required, as in satellites, these factors present ultimate limitations. Also the rotating elements for producing conical scan require substantial amounts of power which may also be a serious factor. The torsion bar of the present invention does not wear out over many years of use and power requirements are very low. It should also be noted that over long periods of operation, which may be measured in years, changes in a rotating device usually imply wear. Any slight changes in resonant period of the torsion bar of the present invention results only in extremely slight changes in the resonance frequency which is completely immaterial to the reliable operation of the system as a whole since the driving circuits automatically adjust their frequency to the resonant frequency of the torsion bar and associated elements. While it is true that certain rotating elements are used in the present invention to indicate departure from level flight these are operated only intermittently for very short periods of time through a very small arc. Therefore, lubrication problems are far less than in a continuously rotating scanner and introduce negligible life limitations.

The present invention will be described in detail and in conjunction with a typical use, in the following drawings, in which.

Figure 1:
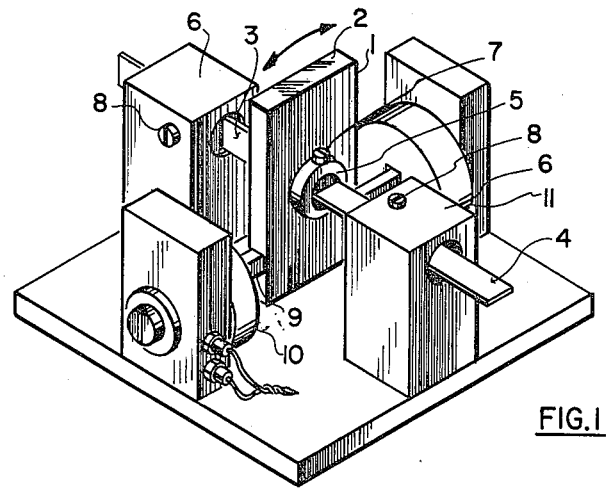
FIG. 1 is an isometric view of a mirror scanning mechanism.
Figure 4:
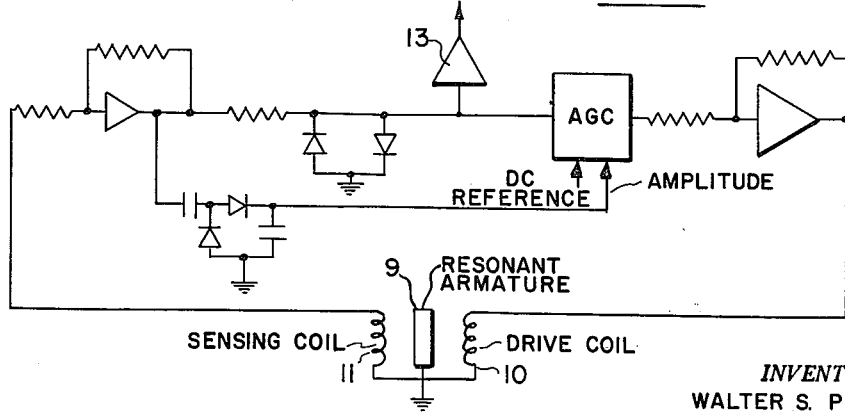
FIG. 4 is a simplified schematic using block representation for conventional circuits including the driving coil and sensing coil.

FIG. 1 shows a mirror scanner oscillating block 1 which carries a small mirror 2 which is oscillated through a small arc shown by the curved arrows. This block is mounted on a torsion bar having sections 3 and 4 in the form of flat plates at right angles to each other. Each end is clamped at 5 and 6 with clamping screws 7 and 8 respectively. Armature elements 9 extend from the lower portion of block 1 into the magnetic fields of a drive coil 10 and a sensing coil 11. These coils are in a circuit producing periodic electrical pulses as shown in the diagram of FIG. 4. It will be seen that the resonant armature 9 determines the frequency of the oscillating circuits in FIG. 4, the components of which are suitably chosen to be electrically resonant at a frequency near, though not necessarily coincident, with, that of the system made up of the block 1, the torsion bar and the armatures 9. The output is maintained at constant amplitude by conventional clamping diodes which form a D.C. reference and a conventional automatic gain control. At the point between the pair of diodes and the automatic gain control the wave shape of the electrical signal in the circuit is a square wave of predetermined amplitude. After passing through a shaping amplifier 13 this constitutes a reference square wave, the use of which will be described further below.

Figures 2, 3:
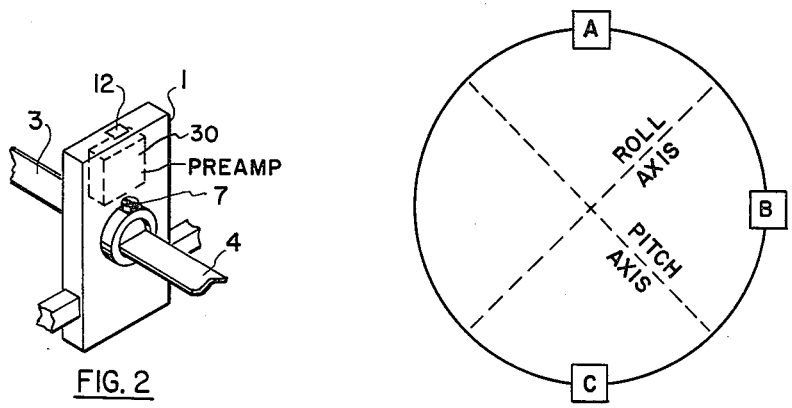
FIG. 2 is a similar isometric view of a portion of a scanner utilizing detector and preamplifier.
FIG. 3 is a plan view of the orientation of instruments on a horizon plane.

Instead of oscillating a mirror in the optical system, it is possible to oscillate a detector 12 in which case it is associated with a miniaturized, transistorized preamplifier 30 to prevent interference by noise generation. This is shown in FIG. 2. The operation of scanning is no different with the two modifications which are typical of variants of invention. For most purposes, the modification of FIG. 1 presents advantages and is preferred.

Figure 5:
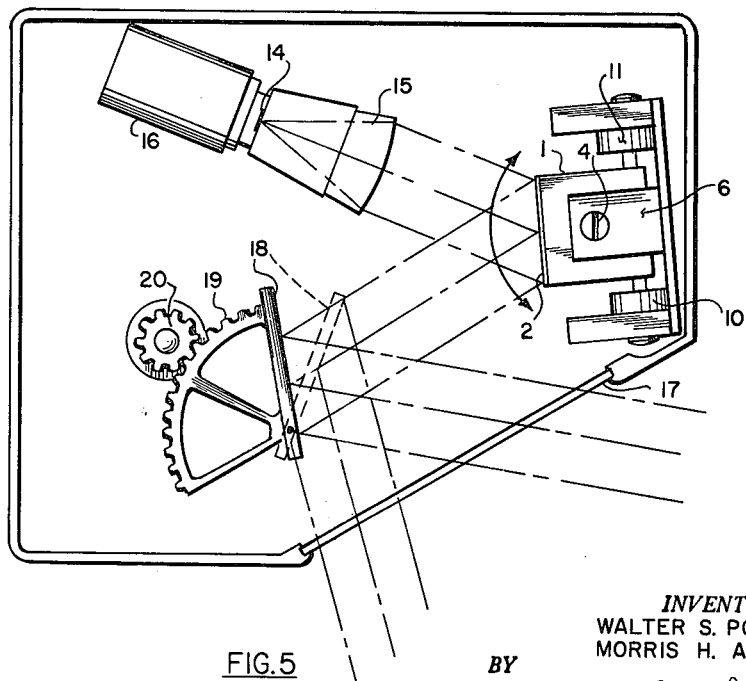
FIG. 5 is a vertical section through an instrument including a scanning mechanism.

When a system according to the present invention is designed using three of the scanners described above, three systems are provided for viewing the reference horizon. One of these is shown in FIG. 5, the same parts bearing the same reference numerals. It will be noted that the scanning mechanism of FIG. 1 is illustrated rather than that of FIG. 2. The whole system includes a detector 14 and preamplifier 16. The detector, which may for example be a thermistor bolometer, is shown as hyperimmersed in the lens 15. For scanning the earth's horizon this lens may advantageously be made of germanium. The particular material of which the lens is made forms no part of the present invention being chosen from among those suitable for the radiation used.

A window 17 is provided oriented so that it is directed generally toward the horizon when the vehicle in which the systems are mounted is in level flight. Incoming radiation strikes the movable mirror 18 which is shown in FIG. 5 in two different positions, the mirror being driven by sector gear 19 and pinion 20. The drive is as described below.

Three instruments of the type shown in FIG. 5 are arranged about a reference circle in the vehicle as is shown in FIG. 3. These three instruments will be referred to as A, B and C. In the circuit diagrams in FIG. 6 the elements associated with each of the systems will be given the appropriate letter suffix.

Figure 6:
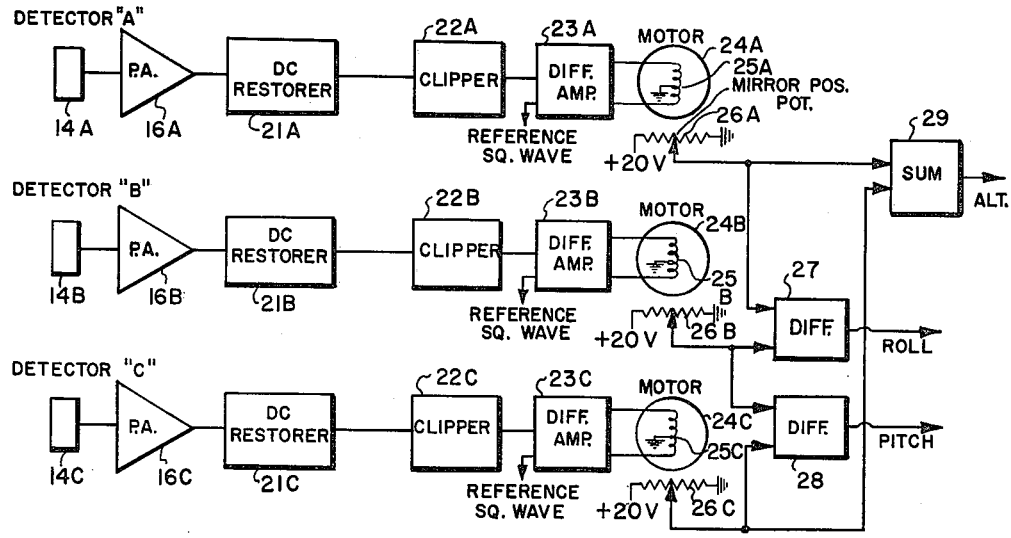
FIG. 6 is a block diagram of electronic circuits of the three detectors of FIGS. 3 and 5.

Turning now to FIG. 6, it will be noted that each of the systems include detectors 14 and preamplifiers 16, designated, of course, as 14 and 16A, B and C respectively. In similar manner the channels are provided respectively with D.C. restorers 21A, B and C, clippers 22A, B and C and differential amplifiers 23A, B and C. Each of the latter receives in a second input a reference square wave from the shaper amplifiers 13 to which reference was made in the description of FIG. 4. The outputs of the differential amplifiers actuate motors 24A, B and C through center tapped windings 25A, B and C. Each of the motors drives a corresponding pinion 20 in the instrument in which it is associated. Each motor is provided also with a signal potentiometer 26. These potentiometers are shown as receiving a D.C. voltage of 20 volts at one end, and grounded at the other. Two difference amplifiers 27 and 28 are actuated respectively by the outputs of the potentiometers 26A and B and 26B and C. A sum amplifying circuit 29 receives inputs from potentiometers 26A and 26C.

In operation let it be assumed that the vehicle, such as a satellite, is in level flight. In this case, each of the three scanning instruments and their scans are centered on the horizon which in the case described may be the earth's horizon. Each detector produces a square wave which is amplified in the corresponding amplifier 16, restored to the same D.C. reference potential in the D.C. restorer 21 and clipped by the clipper 22 so each one of the square waves will be of identical amplitude, and the pulse width of the waves will be the same. When these waves are compared in the differential amplifiers 23 with the reference square wave, they are exactly cancelled and no signal output is produced. As a result, none of the motors 24 turn, and the position of the sliding arms on each of the potentiometers 26 remains in the position corresponding to level flight, which will ordinarily be near center. The inputs to each of the differential amplifiers 27 and 28 will thus be the same, and neither amplifier will put out a signal. However, the sum of the output signals of potentiometers 26A and 26C will represent a quantity, which is a function of the subtense of the horizon across the diameter represented by instruments A and C in FIG. 2. This is an inverse function of altitude, and so, the summing circuit 29 will put out a signal which is also an inverse function of altitude and may be used to actuate a suitable altimeter.

In the further operation let us assume that the satellite rolls slightly. Then the outputs from detectors A and B would change, and, after their motors had turned their mirrors 18 to the position where their scans were once again centered on the horizon, there would be no output from differential amplifier 28 but differential amplifier 27 would give an output signal of the polarity corresponding to the direction in which the satellite had rolled. This error signal would then actuate conventional servo mechanisms to restore the vehicle to level flight at which point the outputs from the potentiometers 26A and B would once again be equal and no signal would come out of the amplifier 27. If, on the contrary, the vehicle moved about the pitch axis the same results would occur except that potentiometers 26A and 26C would be involved and there would be a differential output from amplifier 28.

Finally, let us assume, that while still in level flight the vehicle changes its altitude, for example a satellite in an elliptical orbit. If the altitude changes all three scans would cease to be centered on the horizon. There would be signals from all three amplifiers 23 and the three motors would turn, but they would turn in the same direction and by the same amount. As a result, the outputs from the potentiometers 26, while different, would all be equal and so there would be no differential signal coming from the amplifiers 27 and 28. However, the absolute values of the signal from the potentiometers 26A and 26C would change. They would both be greater if the altitude decreased or smaller if the altitude increased. As a result, the summing circuit 29 would give a different output, and the output would show a different altitude on the altimeter.

One more possibility may be explored although it will not normally occur in practice, at least after the vehicle has attained level flight initially. Suppose that the attitudes of the vehicle about pitch or roll axis change so greatly that one or more of the instruments lost the horizon entirely. Let us suppose that there was so great a movement about the pitch axis that the detector B saw only earth, and detector C saw only space. This would result in the potentiometers 26B and 26C moving to extreme positions, one to maximum, and one to minimum. There would be a very strong error signal from amplifier 27 and one with a polarity which would cause righting mechanisms to move the vehicle in the direction to restore level flight. While this occurrence will not occur normally in a steady vehicle, such as a satellite once in orbit where departures will be from level flight will be very small, and very slow, it is possible before level flight in orbit is achieved or with other vehicles which may be subject to greater movements. In this case sensors, in which the scan must cross a horizon to get useful indications, are then no longer capable of producing the proper restoring signal. It is an advantage of the present invention that no matter how great the departure from normal flight the instruments operate reliably and in a direction to bring the vehicle back again to level flight conditions.

It will be noted that the output of the amplifiers 23 depends on the degree of mismatch of the pulse width of the waves coming from clipper 22 and the reference square wave. In other words, the output of the amplifier becomes less and less as the position of the balance is neared and is so a proportional output which reduces the likelihood of hunting since the motors 24 turn very slowly when balance is approached. This is a practical advantage, especially for long unattended use, as hunting increases the wear on moving parts and is otherwise undesirable. Normally the anti-hunting characteristics of the proportional outputs of amplifiers 23 is sufficient to prevent the motors from overshooting. However, if it is desired to achieve the absolute maximum in this desirable characteristic additional mechanical damping means of conventional design may be used.

The comparison with a reference which determines the operation of motors 24 is illustrated in the drawings by a comparison of a reference square wave with a square wave, or more precisely a rectangular wave, produced from the detectors. This method which involves only A.C. amplifiers to turn the motors presents many practical advantages and is preferred. However, the invention is not limited thereto and any differential amplifier may be used with the proper circuits. For example the signals from the detectors after processing may be integrated by a suitable low pass filter and these outputs may be compared with a reference voltage. This will require, of course, D.C. amplifiers 23. The system functions but only at the expense of the more costly and less stable D.C. amplifiers. Other types of wave shapes which can be compared to each other are also usable and are included in the broader aspects of the systems phase of the present invention.

The invention has been described in more detail in conjunction with infrared detectors. For horizon sensor use these detectors present many advantages, and hence are preferred. They may be used day or night, and the difference between earth radiation and space radiation is very great, so that a sharp horizon results, and signals of optimum form are readily obtainable. However, the operation of the invention is in no sense limited to the use of any particular wavelength and where the conditions are suitable visible light or even ultraviolet energy may be used. The particular radiation wavelength is not the essence of the present invention, and any radiation of wavelength sufficiently short to obey optical laws accurately may be employed. Such radiations will be referred to as optical radiations.

The invention has been described more particularly in systems in which the scanning is across a horizon. This is one of the most important instances of a sharp radiation discontinuity, but it is not the only one possible, and the invention is not limited thereto.

We claim:

1. In an optical scanning system comprising in combination collecting and beam forming optical elements and a detector for optical radiations, said optical elements being in optical alignment, the improvement which comprises oscillatory scanning means comprising an oscillatory member, at least one of the elements of the optical system mounted thereon, said oscillatory member pivoted at its center of oscillation on a torsion bar, means for securing the ends of the torsion bar, the torsion bar comprising flat plate sections on either side of the oscillatory member said flat plate sections being at right angles to each other, armature elements on said oscillatory member and an electrical oscillating circuit including said armature elements and capable of oscillating at the mechanical resonant frequency of the oscillatory element and torsion bar whereby the oscillatory member is prevented from rotation about axes at right angles to each other and at right angles to the torsion bar axis.

2. An optical system according to claim 1 in which the element mounted on the oscillatory element is a beam directing mirror.

3. An optical system according to claim 1 in which the radiation detector is of the electric transducer type and is provided with a preamplifier electric circuit of low mass, the detector constituting the optical element mounted on the oscillatory element and the preamplifier also being mounted on said element.

4. An optical system according to claim 1 for scanning across a line of radiation discontinuity, in which the radiation detector is of the electric transducer type and in which an aimable beam forming element is provided, means for aiming said element, electronic amplifying and processing circuits, means for connecting the output of the detector to the input of the amplifying and processing circuits and means for connecting the output of said circuits to the aiming means in a manner to move the aimed element in a direction to center the oscillatory scanning means on a preselected line of discontinuity of optical radiation.

5. A system according to claim 4 in which the optical scanning element is a beam directing mirror.

6. A system for sensing attitude and altitude of an object above a horizon forming body the horizon constituting a line of optical radiation discontinuity, which comprises in combination at least three optical systems, said optical systems including means for oscillatory scanning across the horizon and aimable beam forming means, an optical radiation detecting means of the electric transducer type, electronic amplifying and processing circuits for each system, means for connecting the outputs of each detector to the inputs of the circuits, means for moving the aimable optical element and means for connecting the output of the electronic circuits to the element moving means, the systems being arranged in the plane of level attitude of the object and disposed to provide symmetrical location of pairs of systems about roll and pitch axes of the body and differential electronic output amplifying means in each pair of systems whereby the aimable elements of each pair are moved to maintain the scan centered on the horizon.

7. A system according to claim 6 in which a pair of the oscillatory optical scanning systems are located on the ends of a diameter of a circle in the object attitude plane and a third system is located in said plane on a radius of said circle equidistant from the first two systems, electronic summing circuits, electronic outputs from the first two systems in proportion to the position of the aimable elements thereof and connecting means from said outputs to said summing circuit whereby a sum is produced which is a function of the angle between the aiming elements of the first two systems and, therefore, a function of altitude above the horizon.

References Cited in the file of this patent
UNITED STATES PATENTS 2,740,961     Slater                 Apr. 3, 1956
2,845,710     Claret et al.            Aug. 5, 1958